United States Patent
Ahn et al.

(10) Patent No.: US 7,623,261 B2
(45) Date of Patent: Nov. 24, 2009

(54) IMAGE FORMING APPARATUS AND METHOD

(75) Inventors: Sang-kil Ahn, Suwon-si (KR); Sung-won Chae, Gwangmyeong-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 925 days.

(21) Appl. No.: 11/028,318

(22) Filed: Jan. 4, 2005

(65) Prior Publication Data

US 2005/0157339 A1 Jul. 21, 2005

(30) Foreign Application Priority Data

Jan. 20, 2004 (KR) .................. 10-2004-0004196

(51) Int. Cl.
*G06K 15/00* (2006.01)
(52) U.S. Cl. .............. 358/1.18; 358/1.12; 358/1.16
(58) Field of Classification Search ........... 358/1.16, 358/1.18, 444, 404, 1.1, 1.4, 1.13, 1.14, 496, 358/498, 1.12
See application file for complete search history.

(56) References Cited

U.S. PATENT DOCUMENTS

| | | | | |
|---|---|---|---|---|
| 6,738,158 B1* | 5/2004 | Lupien et al. | ........... | 358/1.16 |
| 6,914,687 B1* | 7/2005 | Hosoda et al. | ........... | 358/1.1 |
| 2001/0050779 A1* | 12/2001 | Jogo | ........... | 358/1.9 |
| 2002/0051194 A1* | 5/2002 | Sakura | ........... | 358/1.15 |
| 2002/0095352 A1* | 7/2002 | Hitaka | ........... | 705/26 |
| 2006/0023237 A1* | 2/2006 | Endo | ........... | 358/1.13 |
| 2006/0072132 A1* | 4/2006 | Jacobs | ........... | 358/1.9 |

FOREIGN PATENT DOCUMENTS

| | | |
|---|---|---|
| JP | 11-055496 | 2/1999 |
| JP | 2001-205900 | 7/2001 |
| KR | 1999-059665 | 7/1999 |
| KR | 1999-086291 | 12/1999 |

* cited by examiner

*Primary Examiner*—Jerome Grant, II
(74) *Attorney, Agent, or Firm*—Stanzione & Kim LLP

(57) ABSTRACT

An image forming apparatus and method includes a storage device to store a plurality of documents, a user input device to select at least two documents from the plurality of documents stored in the storage device in a predetermined order and selects the number copies to be printed for the at least two selected documents to request complex printing, a print engine to print the at least two selected documents by the selected number of copies, and a controller to control the print engine in such a way that when complex printing is requested, the at least two documents are printed out one by one according to the predetermined order and by the selected number of copies, thereby discharging printed complex documents in the selected number of copies. As a result, it becomes possible to combine the plurality of document files into one complex document and to print a plurality of copies of that complex document.

21 Claims, 4 Drawing Sheets

---

IMAGE FORMING APPARATUS AND METHOD

CROSS-REFERENCE TO RELATED APPLICATIONS

This application claims the benefit of Korean Patent Application No. 2004-4196 filed Jan. 20, 2004, in the Korean Intellectual Property Office, the disclosure of which is incorporated herein in its entirety and by reference.

BACKGROUND OF THE INVENTION

1. Field of the Invention

The present general inventive concept relates to an image forming apparatus and a method thereof, and more particularly, to an image forming apparatus and a method thereof which are capable of integrating a number of documents stored in files into one document and printing the integrated document in a plurality of copies.

2. Description of the Related Art

A printing apparatus operates to form and print an image on paper. Often such a printing apparatus will print a document transmitted from a computer. Newer printing apparatuses are often equipped with a hard disk drive (HDD) incorporated therein, so that it can provide function of storing documents, enabling users to select and print a desired document from the stored documents.

When printing one or more documents stored in an HDD of a printing apparatus, a user operates an operational panel (OPE) provided in the printing apparatus to select a document the user wishes to print, and then to request printing of the selected document. Then, the printing apparatus converts the selected document into printable data and performs the actual printing of the printable data.

When using a printing apparatus, the user may want to print out a complex document which consists of several documents of the HDD. For example, to print out two copies of the complex document which consists of a first and a second documents stored in the HDD, the user first operates an operational panel (OPE) to select the first and the second documents. Then, the user must set the number of copies to be printed for the first and the second documents, and request printing of the documents. Accordingly, with the two copies of the respective documents, the user manually makes two copies of the complex document, each copy consisting of the first and the second documents.

For example, if ten copies of the complex document are required and the complex document consists of 'A', 'B' and 'C' documents among the documents 'A' to 'E' of the HDD, the user operates an operational panel to request printing of ten copies of the 'A' document, printing of ten copies of the 'B' document, and printing of ten copies of the 'C' document. When the ten copies of each of the 'A', 'B' and 'C' documents are prepared, the user makes ten copies of A+B+C complex document, manually.

That is, with a conventional printing apparatus, if it is desired to produce a complex document of the documents stored in an HDD, a user has to print two or more copies of each of the desired documents, and make the complex document by hand, which is quite troublesome and time-consuming.

SUMMARY OF THE INVENTION

The present general inventive concept has been developed in order to solve the above drawbacks and other problems associated with the conventional arrangement. Accordingly, it is an aspect of the present general inventive concept to provide an image forming apparatus and a method thereof which prevents the user inconvenience of having to manually make a new document whenever a complex document, which consists of several documents, is required.

Additional aspects and advantages of the present general inventive concept will be set forth in part in the description which follows and, in part, will be obvious from the description, or may be learned by practice of the general inventive concept.

The above and/or other aspects and advantages of the present inventive concept are achieved by providing an image forming apparatus comprising a storage device (or storage section) to store a plurality of documents, a user input device (or user input section) to select at least two documents in predetermined order among the plurality of documents stored in the storage section and to select a number of copies to be printed for each of the at least two selected documents, thereby requesting complex printing, a print engine (or printing engine section) to print the selected number of copies for each of the at least two selected documents, and a controller (or control section) to control the printing engine section in such a way that when complex printing is requested, the at least two documents are printed out one by one according to the predetermined order and by the selected number of copies, thereby discharging printed complex documents in the selected number of copies.

The image forming apparatus may further comprise a display device (or display section) to display a list of the plurality of documents stored in the storage section, and the control section processes such that the list is displayed on the display section if a request to display the list is made from the user input section.

In addition, the image forming apparatus may further comprise a communication interface (or communication interface section) communicatively connected with a user terminal which loads a list of the plurality of documents stored in the storage section, displays the loaded list, and requests the complex printing, wherein the control section controls the printing engine section in such a way that when complex printing is requested from the user terminal through the communication interface section, the printing engine section executes the complex printing.

The image forming apparatus may further comprise a plurality of stackers respectively loaded with the printed complex documents discharged corresponding to the number of copies to be printed, wherein the control section processes such that printed complex documents are discharged from the printing engine section and loaded onto corresponding stackers.

The storage section may be a hard disk drive.

The foregoing and/or other aspects and advantages of the present general inventive concept may also be achieved by providing an image forming method comprising selecting at least two documents from a stored plurality of documents in a predetermined order, selecting a number of copies to be printed for the at least two selected documents so as to request complex printing, and printing the at least two selected documents one by one according to the predetermined order and by the selected number of copies, thereby discharging the printed documents in the selected number of copies.

The image forming method may further comprise requesting display of a list of the stored plurality of documents, and displaying the list. The documents may be selected from the displayed list.

In addition, the image forming method may further comprise requesting the loading of a list of the stored plurality of documents from a user terminal, loading the list into the user terminal, after a predetermined length of time, requesting the complex printing from the user terminal, and performing the complex printing.

The image forming method may further comprise loading each of the printed complex documents discharged in the selected number of copies onto a corresponding stacker.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
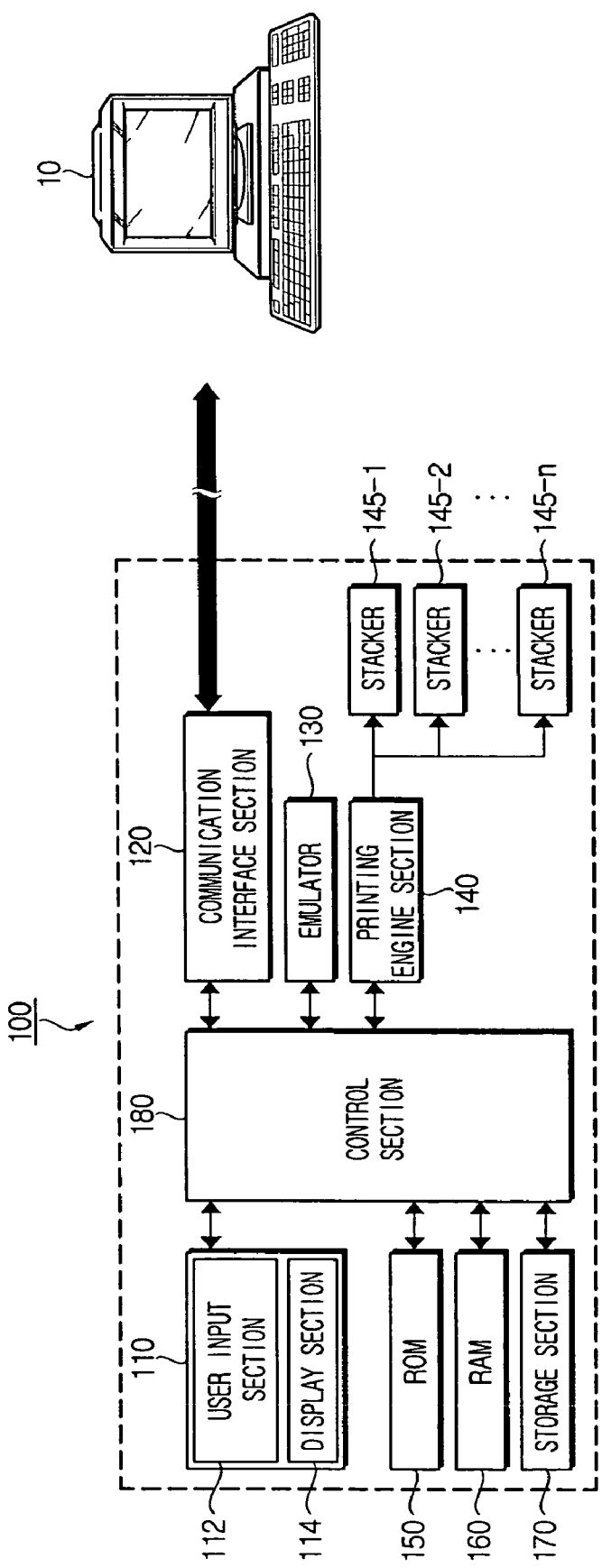
FIG. 1 shows a block diagram schematically illustrating an image forming apparatus according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

The matters defined in the description such as a detailed construction and elements are nothing but the ones provided to assist in a comprehensive understanding of the general inventive concept. Thus, it is apparent that the present general inventive concept can be carried out without those defined matters. Also, well-known functions or constructions are not described in detail since they would obscure the general inventive concept in unnecessary detail.

FIG. 1 shows a block diagram schematically illustrating an image forming apparatus 100 according to an embodiment of the present general inventive concept.

The image forming apparatus 100 comprises an operational panel (or operational panel section) 110, a communication interface (or communication interface section) 120, an emulator 130, a print engine (or printing engine section) 140, a plurality of stackers 145-1, 145-2, . . . , 145-$n$, a read only memory (ROM) 150, a random access memory (RAM) 160, a storage device (or storage section) 170, and a controller (or control section) 180.

The operational panel section 110 has a user input device (or user input section) 112 and a display device (or a display section) 114.

The user input section 112 outputs a signal for requesting a function supported by the image forming apparatus 100 to the control section in response to a user's selection. To this end, the user input section 112 includes various operation keys and a touch screen.

The display section 114 displays the operating status of the image forming apparatus 100 under the control of the control section 180. A liquid crystal display (LCD) is used as the display section 114.

Figure 2:
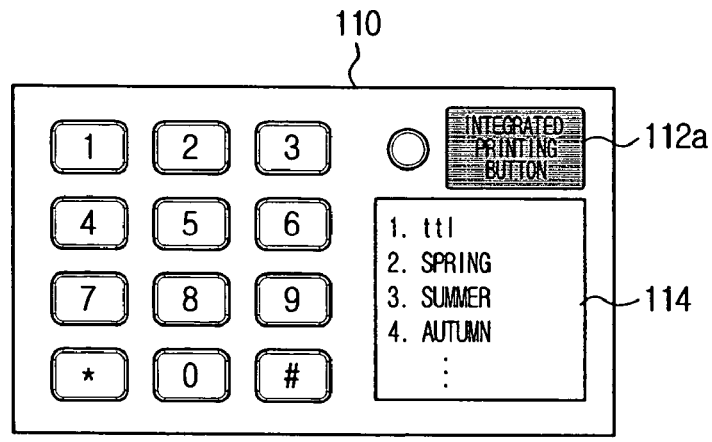
FIG. 2 shows an operational panel section provided in the image forming apparatus shown in FIG. 1.

According to the present general inventive concept, the user input section 112 includes a complex printing button 112$a$ as shown in FIG. 2. If the complex printing button 112$a$ is selected, the display section 114 displays a list of file names of a plurality of documents stored in the storage section 170. When the list is displayed, a user selects, by using the user input section 112, at least two documents from the displayed list in predetermined order, sets a complex printing condition by selecting the number of copies to be printed for the at least two documents, and requests the complex printing. Here, the term, "complex printing" indicates that two or more selected documents are combined and printed out as one document.

The communication interface section 120 is connected to a user terminal 10 in such a way that it is capable of communicating with the user terminal 10 and receiving printing data and signals for requesting the complex printing from the user terminal 10.

The user terminal 10 may be a documenter or a host computer installed with a remote control panel (RCP) program or a driver for the image forming apparatus 100.

The emulator 130 converts printing data received via the communication interface section 120 and documents stored in the storage section 170 into printable data.

The printing engine section 140 prints the printing data outputted from the emulator 130 on paper and discharges the printed paper.

The plurality of stackers 145-1, 145-2, . . . , 145-$n$ are loaded with printed documents discharged from the printing engine section 140.

The ROM 150 stores various control programs required for implementing the functions of the image forming apparatus 100, and the RAM 160 stores various data produced while the image forming apparatus 100 performs its functions.

The storage section 170 may be an HDD, which stores, in file formats, a plurality of documents transmitted from the user terminal 10 via the communication interface section 120.

The control section 180 controls the entire operation of the image forming apparatus 100 according to a control program stored in the ROM 150. For example, when the printing data is received from the user terminal 10, the control section 180 controls the emulator 130 and the printing engine section 140 in such a way that the received printing data is processed into a printable signal and printed.

With the present general inventive concept, when the complex printing is requested, the control section 180 processes such that at least two selected documents are printed one by one according to a predetermined order and by the selected number of copies, thereby discharging printed complex documents in the selected number of copies.

In addition, when the complex printing is requested from the user terminal 10 connected to the communication interface section 120 (which is capable of communicating with the control section 180), the control section 180 controls the printing engine section 140 in such a way that the complex printing is executed on the basis of a complex printing condition set in the user terminal 10.

The control section 180 processes such that the plurality of printed complex documents are discharged from the printing engine section 140 and respectively loaded in the plurality of stackers 145-1, 145-2, . . . , 145-$n$. When one printed complex document is completed, it is loaded into a corresponding stacker.

Hereinbelow, the operation of the control section 180 will be described in more detail with reference the relevant drawings.

Figure 3:
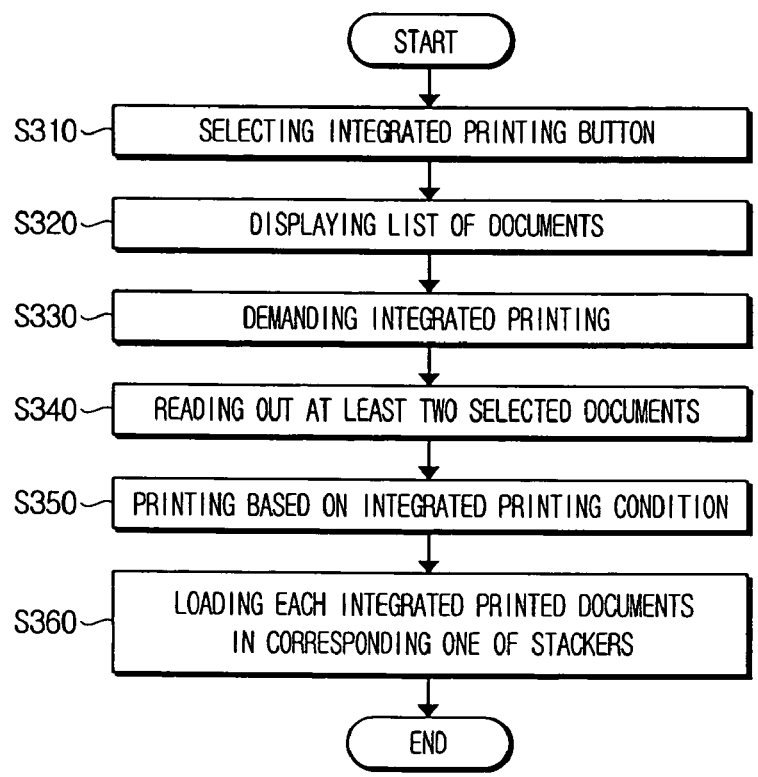
FIG. 3 shows a flow chart describing an image forming method of an image forming apparatus.

FIG. 3 is a flow chart describing an image forming method of an image forming apparatus according to another embodiment of the present general inventive concept.

Referring to FIGS. 1 to 3, if the complex printing button 112a of a user's input section 112 is selected, the control section 180 controls in such a way that a list of file names of individual documents stored in the storage section 170 is displayed on the display section 114 (S310, S320).

If the complex printing as described above is requested by operating a user's input section 112 after the list is displayed on the display section 114, the control section 180 reads out at least two document data selected from the storage section 170 (S330, S340). In operation S330, the "complex printing conditions" refers to the conditions that at least two documents are selected from the list in the predetermined order and that the number of copies to be printed is set.

If operation S340 is performed, the control section 180 controls the printing engine section 140 in such a way that the printing engine section 140 performs complex printing on the basis of the complex printing condition set by using the read-out document data (S350). That is, the control section 180 controls the printing engine section 140 in such a way that the at least two selected documents are printed one by one according to the selected order and the printing is repeated by the selected number of copies to be printed, thereby discharging printed complex documents corresponding to the selected number of copies.

Then, the control section 180 processes the plurality of printed complex documents discharged from the printing engine section 140 in such a way that they are individually loaded in the plurality of stackers 145-1, 145-2, ..., 145-n (S360).

For example, if ten copies of a complex document consisting of a 'summer' document, a 'spring' document, and an 'autumn' document among a plurality of documents stored in the storage section are required, the user operates the complex printing button 112a to request display of the list of the documents. Then, if the list as shown in FIG. 2 is displayed, the user selects the documents in the 'summer'→'spring'→'autumn' order and selects the number of copies, '10.' Accordingly, the control section 180 reads out the data of the 'summer,' 'spring,' and 'autumn' documents on the basis of the selected order, and outputs the document data consisting of 'summer+spring+autumn' to the printing engine section 140 ten times. Consequently, the printing engine section 140 repeatedly prints a complex document consisting of 'summer+spring+autumn' ten times, thereby discharging ten printed complex documents. At this time, the discharged ten printed complex documents are loaded into corresponding stackers 145-1, 145-2, ..., 145-n. In this case, the plurality of stackers 145-1, 145-2, ..., 145-n move ten times.

Meanwhile, the image forming apparatus 100 and the method thereof can also perform the complex printing by using an RCP program in a user terminal beyond the operational panel section 110 as described above. That is, the complex printing of a plurality of documents stored in the storage section 170 can be requested from the user terminal 10.

If the user terminal 10 and the image forming apparatus 100 communicate with each other using parallel transmission protocol or USB transmission protocol, the user executes RCP program or web browser. As a result, the user terminal 10 accesses the image forming apparatus 100, and a list of the plurality of documents stored in the storage section 170 is loaded in the user terminal 10. Then, the user terminal 10 displays the loaded list from which documents may be selected. The user terminal 10 requests that the image forming apparatus 100 perform the complex printing on the basis of the selections. That is, if the user selects at least two documents in predetermined order from the list displayed on the user terminal 10 and selects the number of copies to be printed, the user terminal 10 outputs the selected complex printing condition and signals for requesting complex printing to the image forming apparatus 100.

In addition, if the user terminal 10 and the image forming apparatus 100 are interconnected via a network interface card (NIC), a local area network (LAN), and/or the Internet, it is possible to request the complex printing by using a web browser. For this purpose, the user terminal 10 executes a web browser (e.g., Microsoft's Internet Explorer) in response to the user's request.

Figure 4A:
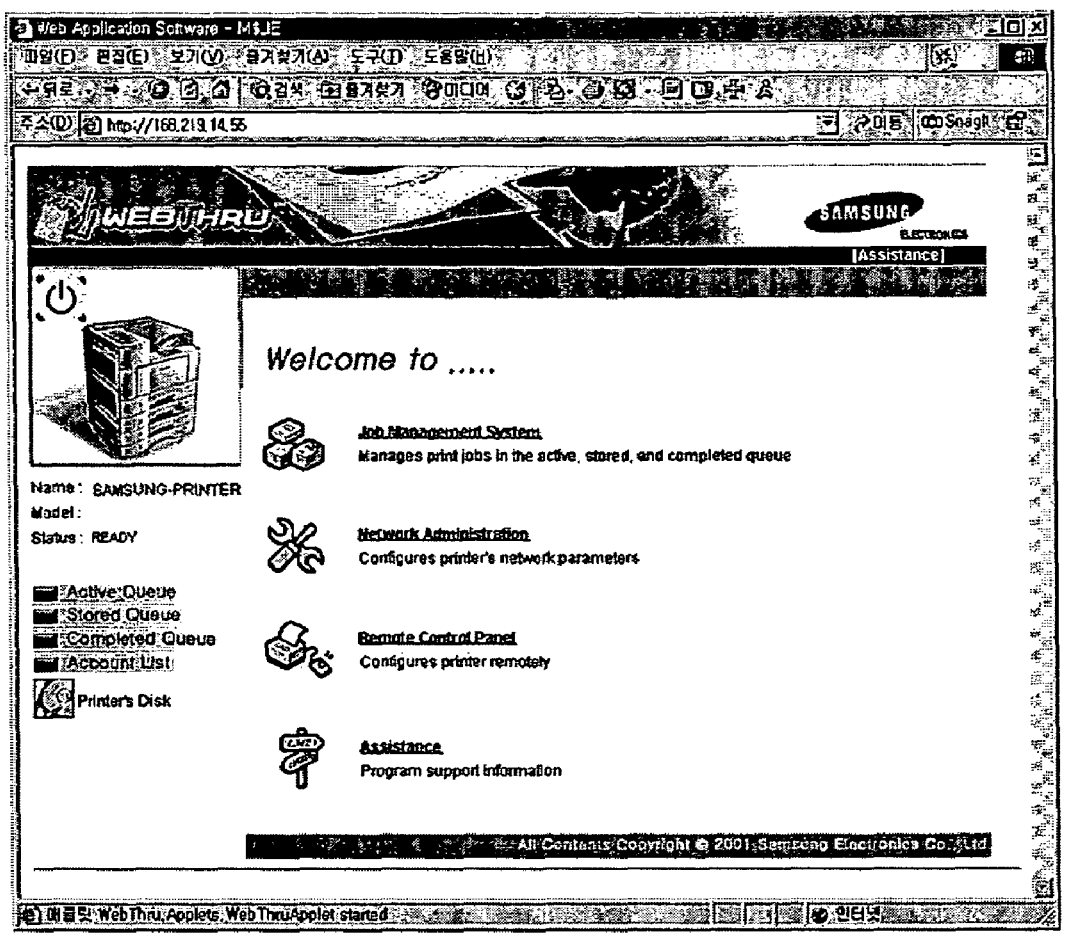
FIG. 4A shows a web-page in communication with the image forming apparatus.

If the Internet protocol (IP) address of the image forming apparatus 100 is inputted into a universal resource locator (URL) input window of the executed web browser, the user terminal 10 accesses a web server corresponding to the inputted IP address (i.e., the image forming apparatus 100), and displays a web page as shown in FIG. 4A.

Figure 4B:
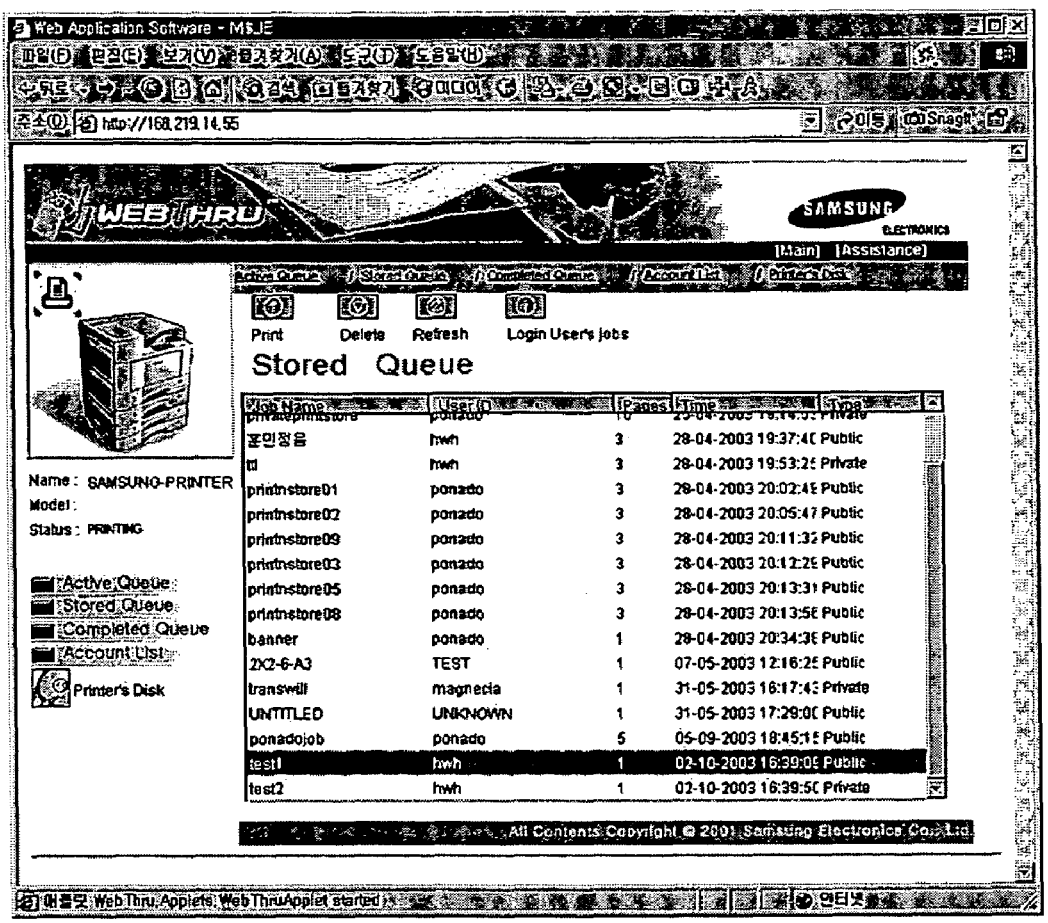
FIG. 4B shows a list of documents stored in a storage section of FIG. 1.

If a user-interface (UI) screen having the form of the operational panel section 110 is displayed on the web page, the user may request a list of documents stored in the storage section 170 by using an input device such as a mouse. The list may be displayed on the user terminal 10 as shown in FIG. 4B. The user may select complex printing conditions and request complex printing from this UI.

If complex printing request signals are received through the communication interface section 120, the control section 180 controls the printing engine section 140 in such a way that the complex printing is executed on the basis of the complex printing conditions selected in the user terminal 10.

The image forming apparatus 100 of the present general inventive concept may be embodied as a printer, a multiple-function combined machine or the like that includes a mass storage recording medium such as an HDD.

As described above, according to embodiments of the image forming apparatus and a method thereof, it is possible to integrate a plurality of documents stored in files into one document and then print a plurality of copies of that document. In particular, because printing is performed in the selected order of files one by one and repeated by the required number of copies to be printed, it is possible to avoid the inconvenience of manually classifying the printed documents. Furthermore, because each printed document is loaded in a corresponding stacker as that is printed out, it is easy to classify complex documents printed out from selected files.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus comprising:
   a storage device to store a plurality of documents;
   a user input device to select a complex document having at least two documents in a predetermined order among the plurality of documents stored in the storage device and to select a number of copies to be printed for each of the at least two selected documents;

a print engine to print the selected number of copies for each of the at least two selected documents; and a controller to control the print engine to print the at least two documents according to the predetermined order and the selected number of copies.

2. The image forming apparatus according to claim 1, further comprising:

a display device to display a list of the plurality of documents stored in the storage device, wherein the controller selectively causes the list to be displayed on the display device.

3. The image forming apparatus according to claim 1, further comprising:

a communication interface communicatively connected with an external user terminal which loads a list of the plurality of documents stored in the storage device, displays the loaded list, and requests the complex printing, wherein the controller selectively causing the print engine upon receipt of a user terminal request to print the at least two documents according to the selected number of copies.

4. The image forming apparatus according to claim 1 further comprising:

a plurality of stackers, wherein the controller causes the at least two documents discharged from the print engine to be loaded into a corresponding stacker.

5. The image forming apparatus according to claim 1, wherein the storage device comprises a hard disk drive.

6. An image forming apparatus comprising:

a print engine; and a controller to receive a complex document having at least two documents arranged in an order and a signal indicating the number of copies of the complex document, and to control the print engine to print the complex document according to the order and number of copies.

7. The image forming apparatus according to claim 6, wherein each of the at least two documents comprises a filename in which one or more pages are included.

8. The image forming apparatus according to claim 6, further comprising:

a user input device to select the at least two documents from a list of documents.

9. The image forming apparatus according to claim 6, wherein the at least two documents comprise a first document file and a second document file, and the controller controls the print engine to print the first document filed and the second document file.

10. The image forming apparatus according to claim 9, wherein the number of copies comprises a first copy and a second copy, and the print engine discharges the first copy of the printed first and second document files in a first stack, and the second copy of the printed first and second document files in a second stack.

11. The image forming apparatus according to claim 6, further comprising:

an operational panel to display a list of documents, wherein the at least two documents are selected from the displayed list of documents.

12. The image forming apparatus according to claim 11, wherein the operational panel comprises a user input device.

13. The image forming apparatus according to claim 12, wherein the user input device comprises a complex printing button which initiates creation of the complex document.

14. An image forming method comprising:

selecting a complex document having at least two documents from a stored plurality of documents in a predetermined order;

selecting a number of copies to be printed for the at least two selected documents; and printing the at least two selected documents according to the predetermined order and by the selected number of copies.

15. The image forming method according to claim 14, further comprising:

requesting display of a list of the stored plurality of documents; and displaying the list, wherein the at least two documents are selected from the displayed list.

16. The image forming method according to claim 14, further comprising:

receiving from a user terminal a request for a list of the stored plurality of documents; and transmitting the list to the user terminal;

wherein the selecting of the at least two documents and the selecting of the number of copies are performed from the user terminal.

17. The image forming method according to claim 14, further comprising:

loading each copy of the at least two selected documents onto a corresponding stacker.

18. A computerized method of forming a unitary complex document, the method comprising:

accessing a plurality of documents in a computerized database;

selecting at least two documents from the plurality of documents in the computerized database;

selecting an order for the at least two documents;

integrating the contents of the at least two documents in the selected order into a unitary complex document;

selecting a number of copies of the unitary complex document to be printed; and printing the unitary complex document.

19. The computerized method according to claim 18, further comprising: displaying a list of the plurality of documents in the computerized database.

20. The computerized method according to claim 18, wherein the selecting of the at least two documents and the selecting of the order for the at least two documents are performed via a remote computing device.

21. The computerized method according to claim 18, further comprising: loading of the printed unitary complex document into movable stacker.

* * * * *

UNITED STATES PATENT AND TRADEMARK OFFICE
CERTIFICATE OF CORRECTION

PATENT NO. : 7,623,261 B2 Page 1 of 1
APPLICATION NO. : 11/028318
DATED : November 24, 2009
INVENTOR(S) : Ahn et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1357 days.

Signed and Sealed this

Twenty-sixth Day of October, 2010

David J. Kappos
*Director of the United States Patent and Trademark Office*